United States Patent [19]

Heidner et al.

[11] Patent Number: 4,600,075
[45] Date of Patent: Jul. 15, 1986

[54] TRANSMISSION NEUTRAL RETURN FOR LAWN AND GARDEN VEHICLES

[75] Inventors: Richard C. Heidner, West Bend; Clyde R. Wetor, Cascade; Bruce H. Fiedler, Plymouth, all of Wis.

[73] Assignee: Gilson Brothers Company, Plymouth, Wis.

[21] Appl. No.: 700,467

[22] Filed: Feb. 11, 1985

[51] Int. Cl.⁴ .............................................. B60K 23/00
[52] U.S. Cl. ...................................... 180/336; 180/307
[58] Field of Search ................ 180/336, 315, 272; 267/150; 74/474

[56] References Cited

U.S. PATENT DOCUMENTS 3,354,981 11/1967 Swanson .............................. 180/336
3,912,033 10/1975 Ancel ................................. 180/307

FOREIGN PATENT DOCUMENTS 561234 5/1944 United Kingdom ................ 180/336

*Primary Examiner*—John J. Love
*Assistant Examiner*—K. L. Ferriter

[57] ABSTRACT

A control assembly for use in controlling the operation of a hydrostatic transmission of a lawn and garden vehicle. The control assembly is selectively adjustable such that it can be set precisely at the neutral position of the transmission. The control assembly also provides means for causing the transmission to positively return to its neutral position after operation in either the forward or reverse driving modes.

17 Claims, 10 Drawing Figures

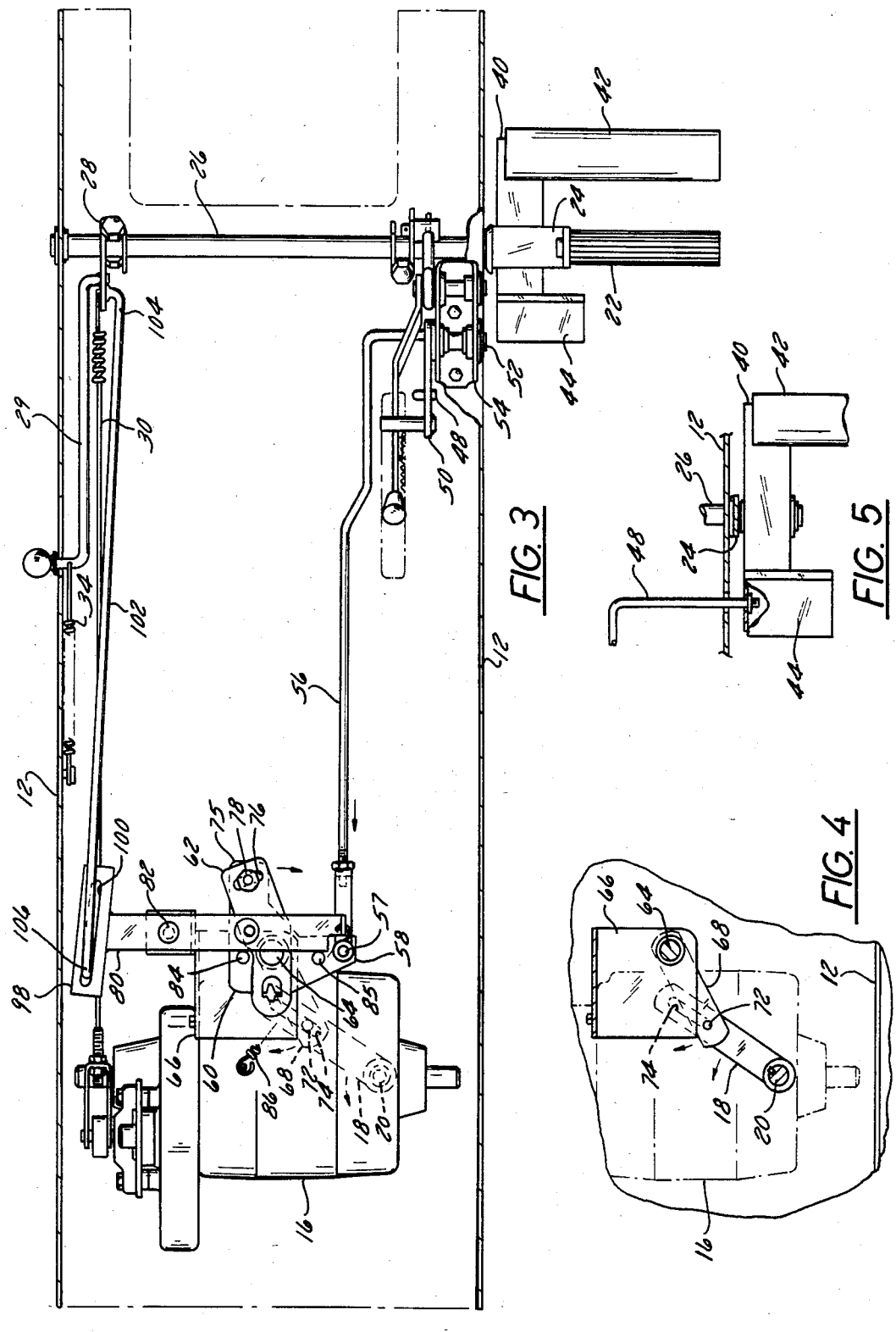

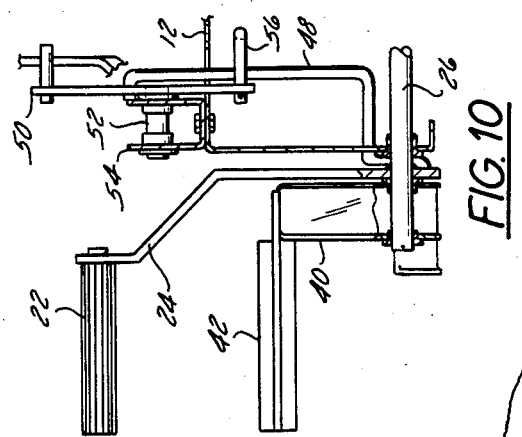
FIG.10
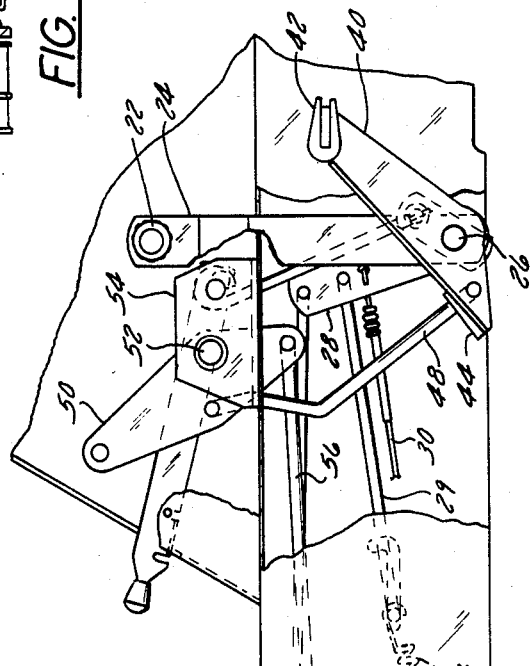
FIG.8
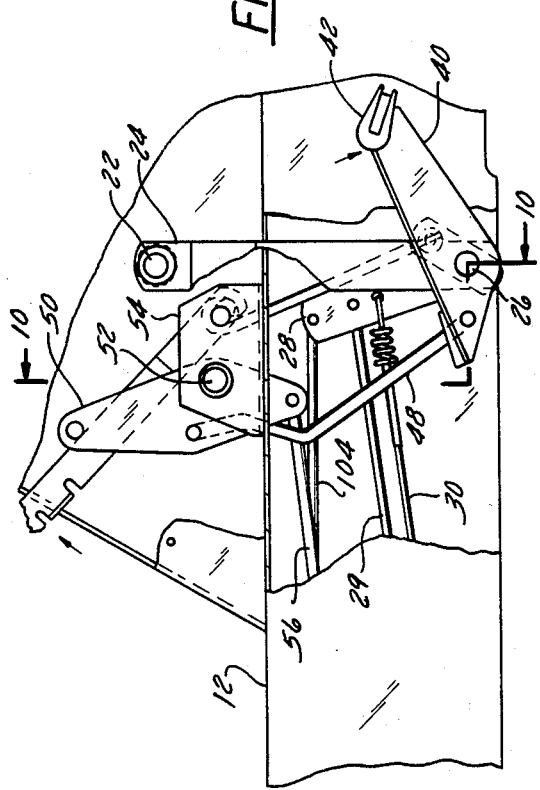
FIG.9
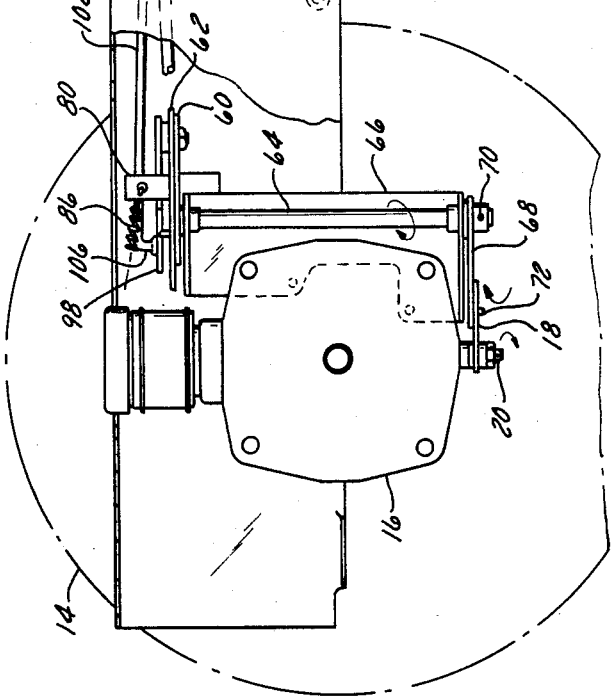

TRANSMISSION NEUTRAL RETURN FOR LAWN AND GARDEN VEHICLES

FIELD OF THE INVENTION

The invention relates to lawn and garden vehicles and other similar vehicles employing hydrostatic transmissions, and more particularly to transmission shift and speed control arrangements for such lawn and garden vehicles.

BACKGROUND OF THE INVENTION

Prior art lawn and garden vehicles and similar machines have employed hydrostatic transmissions. Such transmissions commonly include a control lever which is moveable from a neutral position to a forward position and wherein the degree of movement of the lever controls the speed of the vehicle employing the hydrostatic transmission. Movement of the lever from a neutral position to a reverse position causes the vehicle to be driven rearwardly, and the rearward speed of the vehicle is similarly dependent on the degree of movement of the control lever. One of the problems associated with the use of hydrostatic transmissions in lawn and garden vehicles and other similar vehicles, is that the operator's control mechanism may be ineffective to cause the transmission control lever to return to its precise neutral position. When the operator moves the drive control lever or foot pedal to a neutral position, the transmission control lever may be positioned such that the transmission is in a low speed forward or reverse operating condition.

With common hydrostatic transmissions the control lever may have a very narrow or small range of movement in the neutral operating position and such that only a minor change in the position of the transmission control lever may cause shifting of the transmission from neutral to forward or reverse. Additionally, the neutral position of the transmission control lever can vary from one hydrostatic transmission to another such that the control linkage of one vehicle may hold a transmission in the neutral position when the hand control lever or foot pedal is in a neutral position, while in another like vehicle, with the hand control lever or foot pedal in a neutral position, the control linkage may hold the transmission control lever in a position which for that particular transmission is either a forward or reverse driving position.

In prior art vehicles including hydrostatic transmissions, the apparatus provided for causing the transmission to return to the neutral position is commonly located in a position remote from the vehicle transmission and is also commonly relatively inaccessible. Such contructions prevent preadjustment of the neutral return device until substantial completion of the manufacture of the vehicle due to common dimensional variation of the many parts between the return to neutral mechanism and the transmission control shaft.

Another problem experienced with prior art return to neutral arrangements is that connecting linkages tend to wear as the vehicle is used and as the frame or other vehicle components deform with use, and the neutral return apparatus requires frequent adjustment. Such adjustment is commonly difficult because of inaccessibility of the adjusting mechanisms.

SUMMARY OF THE INVENTION

The present invention provides a traction drive speed and direction control arrangement for use in controlling a hydrostatic transmission embodied in a lawn or garden vehicle or the like wherein means are provided for insuring movement of the transmission control lever to a neutral position when the hand control lever or control pedal is shifted to a neutral position by the operator.

In one form of the invention, the vehicle includes a hydrostatic transmission having a pivotable shaft for controlling shifting of the transmission from neutral to forward and reverse and a transmission control lever is fixed to the pivotable shaft. The vehicle includes a foot pedal or other speed and direction control device, such as a hand control lever, connected by a linkage to the transmission control lever. In one form of the invention, a foot pedal can be employed and is supported such that a forward portion of the foot pedal is depressed to cause the control lever to move to a forward driving position and wherein a rearward portion of the foot pedal is depressed to cause the control lever to be moved to a position to cause rearward driving of the transmission. The apparatus provided by the present invention for connecting the foot pedal to the transmission control lever includes adjustment means such that the transmission control lever can be positioned in the proper neutral position when the vehicle foot pedal is in a neutral position.

In another embodiment of the invention the speed and direction control device comprises a hand operated lever connected to the transmission control lever such that when the hand operated lever is moved upwardly and/or forwardly, the vehicle is driven forwardly and when the hand operated lever is moved rearwardly and/or downwardly the vehicle is driven rearwardly.

One of the principal advantages of the present invention is that the neutral return apparatus is mounted directly on the vehicle transmission and adjacent to the transmission control shaft. Additionally the apparatus comprising the return to neutral assembly can be assembled before the transmission is embodied in the vehicle, and once in place the return to neutral apparatus is readily accessible and adjusted relatively easily.

Another advantage of the return to neutral apparatus of the invention is that the structural elements of the return to neutral device are mounted on the transmission and any variations in linkages, frame flexing or linkage wear will have no effect on the ability of the apparatus to cause the transmission to consistently return to neutral.

Referring more specifically to the construction of the apparatus embodying the invention, the invention includes a control assembly for use in controlling the operation of a transmission, the transmission including a drive control member movable from a neutral position in one direction to cause the transmission to be shifted to a forward driving mode, and movable from the neutral position in an opposite direction to cause the transmission to be shifted to a reverse driving mode. The control assembly comprises a first lever supported for pivotal movement about a pivot axis and connected to the drive control member for selectively causing movement of the drive control lever from the neutral position in the one direction in response to pivotal movement of the first lever from a neutral position to a forward driving position and for selectively causing movement of the drive control lever from the neutral position in the opposite direction in response to pivotal movement of the first lever from a neutral position to a rearward driving position. The control assembly also includes a second lever supported for pivotal movement about the pivot axis and selectively movable with respect to the first lever, and a control member supported for pivotable movement from a neutral position in a first direction and from the neutral position in an opposite direction. The control member is adapted to be controlled by the operator. The control assembly further includes a linkage operably connecting the control member to the second lever such that pivotal movement of the control member causes pivotal movement of the second lever about the pivot axis, and means for selectively securing the second lever to the first lever such that the first lever will pivot about the pivot axis with the second lever when the control member causes movement of the second lever.

The invention also includes a lawn and garden vehicle comprising a frame, wheels for supporting the frame for movement along the ground, an engine, and a transmission driven by the engine and for selectively drivingly connecting the engine to the wheels to drive the wheels. The transmission includes a drive control member movable from a neutral position in a first direction to a forward driving position and movable from the neutral position in an opposite direction to a reverse driving position. A hand operated lever or control foot pedal is supported for pivotal movement about a pivot shaft between a neutral position and a forward driving position and to a rearward driving position. Means are also provided for drivingly connecting the hand operated control lever or foot pedal to the drive control member for causing movement of the drive control member from the neutral position to a forward driving position when the hand operated control lever or foot pedal is moved from the neutral position to a forward driving position and for causing movement of the drive control member from the neutral position toward the reverse driving position when the hand operated control lever or foot pedal is moved from the neutral position to the hand operated control lever or foot pedal rearward driving position. The means for drivingly connecting further includes means for adjustably positioning the drive control member in the neutral position when the hand operated control lever or foot pedal is in the neutral position.

One principal feature of the invention is the provision of means for biasing the second lever toward a position wherein the drive control member will be in a neutral position. This means for biasing includes a pair of spaced apart stop members secured to the second lever and a bar supported for pivotal movement about a pivot axis parallel to the first pivot axis and spaced from the first pivot axis, and the bar engaging both of the spaced apart stop members when the second lever is in the neutral position. A resilient spring means is provided for biasing the bar against the stop members. This spring functions to cause the first and second levers to return to the neutral position if the force on the foot pedal or hand operated control lever is removed.

Another principal feature of the invention is a means for selectively adjusting the position of the second lever with respect to the first lever when a means for selectively securing the levers together is released and the levers are freely movable with respect to one another.

In one embodiment of the invention the first lever includes a bore and the second lever includes a slot aligned with the bore, and the means for selectively securing includes a threaded fastening member extending through the bore and the slot.

Various features of the invention will be apparent by reference to the following description of a preferred embodiment, from the claims, and from the drawings.

BRIEF DESCRIPTION OF THE DRAWINGS

FIG. 3 is a cross-section partial view of the lawn and garden vehicle shown in FIGS. 1 and 2 and showing a transmission control arrangement embodying the invention.

FIG. 4 is a partial bottom view of apparatus shown in FIG. 3.

FIG. 5 is a partial plan view of a transmission control pedal embodied in the lawn and garden vehicle shown in FIGS. 1 and 2.

FIG. 8 is a cross section side elevation view of apparatus illustrated in FIG. 3.

FIG. 9 is a partial view of apparatus shown in FIG. 8 and with the transmission control apparatus in a second operating position.

FIG. 10 is a cross section view taken generally along line 10—10 in FIG. 9.

Figure 1:
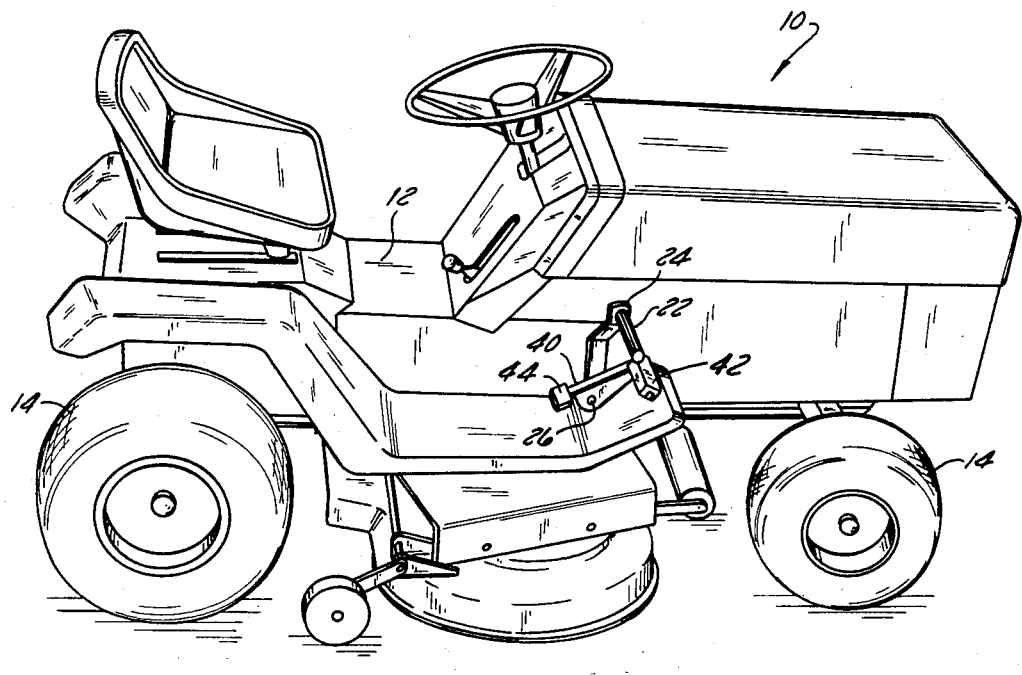
FIGS. 1 and 2 are perspective views of a lawn and garden vehicle embodying the present invention.
Figure 2:
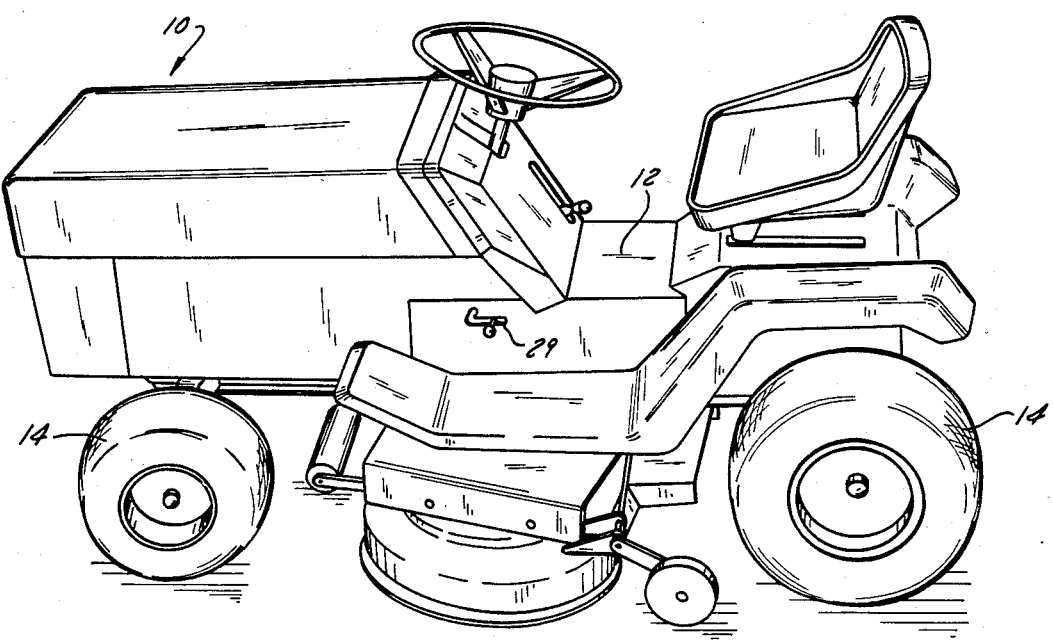

Before describing a preferred embodiment of the invention in detail, it is to be understood that the invention is not limited in its application to the details of construction nor to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

FIG. 1 illustrates a lawn and garden vehicle 10 including a frame 12 and having a plurality of wheels 14 supporting the frame 12. The lawn and garden vehicle also includes an engine supported by the frame as well as a transmission 16 (FIG. 3) for drivingly connecting the engine to the wheels 14.

While the transmission 16 of the lawn and garden vehicle 10 could have other constructions, in the illustrated arrangement, the transmission 16 is a hydrostatic transmission and includes a control lever 18 (FIG. 4) connected to a speed control shaft 20. The transmission control lever 18 is movable from a neutral position in a first direction to cause forward driving movement of the of the driving wheels and consequent forward movement of the lawn and garden vehicle and from the neutral position in a second direction to cause rearward driving movement of the driving wheels and consequent rearward movement of the vehicle. In the particular arrangement illustrated, as the control lever 18 is moved forwardly, the speed of the vehicle drive wheels 14 is increased proportionately to the amount of movement of the control lever 18 in the forward direction, and the degree of movement of the lever 18 in the rearward direction similarly controls the speed of rearward movement of the vehicle driving wheels 14.

The vehicle 10 also includes conventional brakes and a brake pedal 22 for use by the operator in applying the brakes. As illustrated in FIGS. 1 and 3, the brake pedal 22 is supported on the end of a lever arm 24 fixed to a brake shaft 26. The brake shaft 26 is supported by the frame 12 for rotation about a horizontal axis transverse to the center line of the machine frame.

Figure 7:
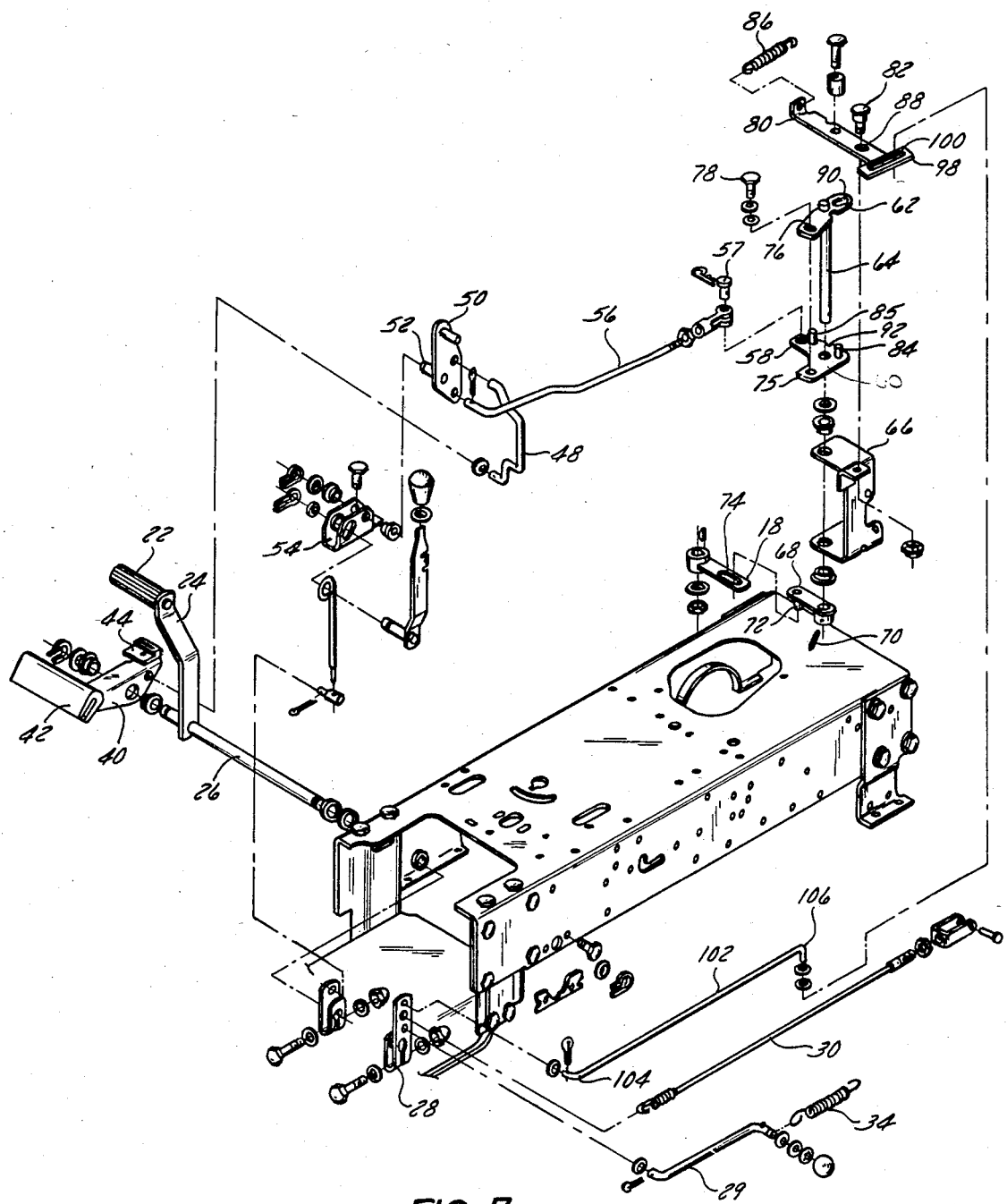
FIG. 7 is an exploded perspective view of apparatus illustrated in FIG. 3.

In the preferred form of the invention, the brake assembly includes a bracket 28 (FIGS. 3 and 7) fixed to the brake shaft 26 and rotatable with the shaft 26 in response to a forward and rearward movement of the brake pedal 22. A cable 30 is connected to a portion of the bracket 28 and in spaced relation above the longitudinal axis of the shaft, and the cable 30 is connected in a conventional manner to the vehicle brake assembly such that when the brake pedal 22 is depressed, the cable 30 is pulled forwardly thereby applying the vehicle brakes.

Means are also provided for biasing the brake pedal 22 to its return position or brake release position. In the illustrated construction, this means for biasing includes a coil spring 34 connected to the machine frame 12, and this spring 34 is connected to the bracket 28 by a connecting rod 29. The coil spring 34 applies a rearward biasing force on the upper end of the bracket 28 thereby tending to pull the upper end of the bracket 28 rearwardly and thereby pulling the connected brake pedal 22 to a brake release position.

The vehicle embodying the invention also includes a manually operable speed and direction control. While in other constructions the speed and direction control could comprise a hand operated control lever, in the illustrated arrangement it comprises a foot pedal 40. The vehicle also includes means for operably connecting the foot pedal 40 to the transmission 16 such that movement of the foot pedal 40 will cause forward and rearward movement of the vehicle 10 as well as control the speed of the vehicle. In the illustrated arrangement the foot pedal 40 is supported on the end of the brake shaft 26 for rocking movement on the shaft 26. The foot pedal 40 is freely rotatable on the shaft 26 such that shaft 26 does not rotate with the foot pedal 40. The foot pedal includes a foot pad 42 mounted on the forward portion of the foot pedal 40 and adapted to be depressed to thereby cause forward motion of the vehicle and a heel pad 44 mounted on a rearward portion of the foot pedal 40 and adapted to be depressed to cause rearward motion of the vehicle and to control the speed of rearward movement of the vehicle. The foot pedal 40 is supported by the brake shaft 26 for rotation about an axis between the foot pad 42 and the heel pad 44 such that forward and downward pressure on the foot pad 42 causes rotation of the foot pedal 40 in one direction and pressure on the heel pad 44 causes rotation of the foot pedal 40 in an opposite direction.

Means are also provided for connecting the foot pedal 40 to the transmission control lever 18 such that forward movement of the foot pad 42 causes movement of the control lever 18 such that the drive wheels 14 are driven forwardly and, downward movement of the heel pad 44 causes movement of the control lever 18 such that the drive wheels are driven rearwardly. While the means for connecting the foot pedal 40 to the transmission control lever 18 could have other constructions, in the illustrated arrangement the means for connecting the foot pedal 40 to the transmission control lever 18 includes a speed and direction control link 48 (FIG. 8) having one end connected to the foot pedal 40 and an opposite end pivotally connected to a speed and direction control lever 50. The speed control lever 50 is fixed to a shaft 52, and the shaft 52 is in turn supported by a bracket 54 fixed to the vehicle frame 12. The shaft 52 and the speed control lever 50 are supported by the bracket 54 for pivotal movement about a horizontal axis generally parallel to the axis of rotation of the foot pedal 40. The one end of the speed control link is connected to the foot pedal 40 rearwardly and in spaced relation from the pivot axis of the foot pedal 40, and the opposite end of the speed control link 48 is connected to the speed control lever 50 at a point spaced from the pivot axis of the speed control lever 50 and such that pivotal movement of the foot pedal 40 causes pivotal movement of the speed control lever 50.

Figure 6:
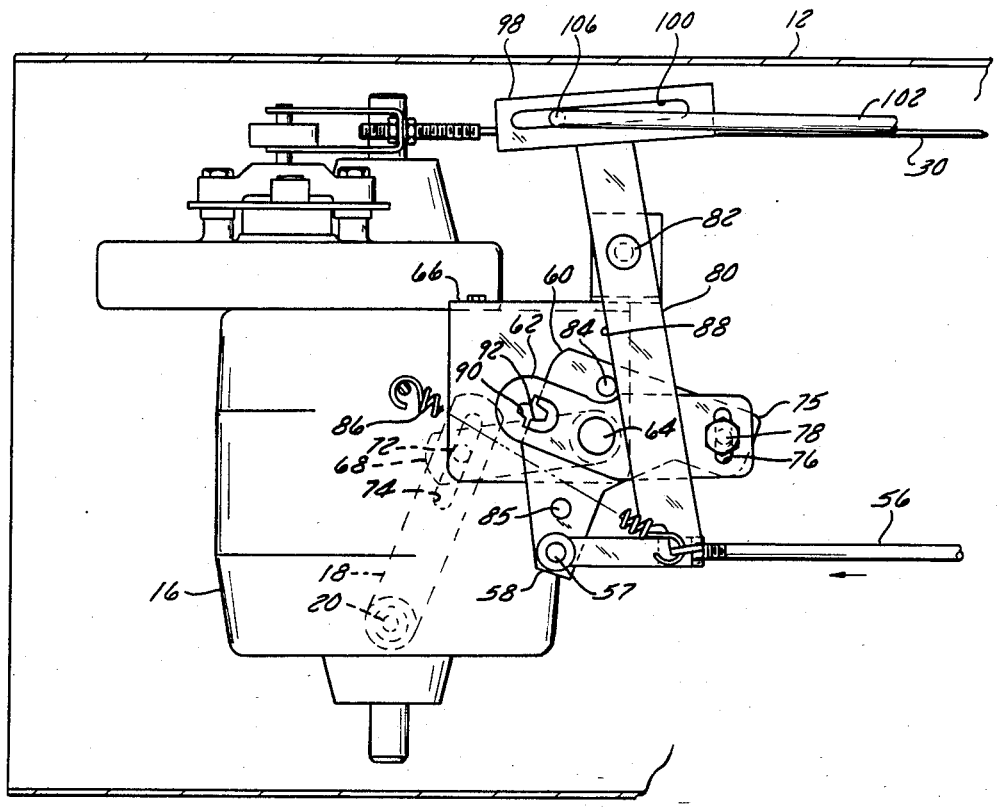
FIG. 6 is an enlarged view of apparatus illustrated in FIG. 3 and showing the transmission control apparatus in an alternative position.

A second speed control link 56 has one end pivotally connected to the speed control lever 50 and an opposite end pivotally connected by a pin 57 to a free end of a lever arm 58 of a bellcrank 60 (FIGS. 3 and 6). The one end of the speed control link 56 is spaced from the pivot axis of the speed control lever 50 such that pivotal movement of the speed control lever 50 causes the speed control lever 50 to push or pull the second speed control link 56 and thereby cause pivotal movement of the bellcrank 60 about a vertical axis.

Means are also provided for adjustably connecting the bellcrank 60 to the control lever 18 of the transmission 16 so as to cause movement of the control lever 18 in response to pivotal movement of the bellcrank 6 about its vertical pivot axis. While the means for adjustably connecting the bellcrank 60 to the control lever 18 could have other constructions, in the illustrated arrangement that means includes a lever 62 fixed to the upper end of a shaft 64 for rotation with the shaft. The shaft 64 is supported by a bracket 66 in turn fixed to the transmission 16. The bracket 66 includes vertically aligned bores supporting the shaft 64 for free rotation about a vertical axis. The lower end of the shaft 64 supports an end of a pivotable arm 68, and a pin 70 joins the arm 68 to the shaft 64 such that the arm 68 pivots with the vertical shaft 64. The free end of the arm 68 includes a pin 72 housed in a longitudinally extending slot 74 in the transmission control lever 18.

The bellcrank 60 is supported on the vertical shaft 64 for rotation about the vertical pivot axis of the shaft 64.

Means are also provided for adjustably fixing a free end of a second lever 75 of the bellcrank 60 to an end of the lever 62 such that pivotal movement of the bellcrank 60 will cause pivotal movement of the lever 62 and the vertical shaft 64 about the vertical axis of the shaft. In the illustrated arrangement, the means for adjustably connecting includes a slot 76 provided in the lever arm 62 mounted on the shaft 64. A bolt 78 extends through a bore in the second lever arm 75 of the bellcrank 60 and through the slot 76, and the slot 76 is arranged to permit adjustable pivotal movement of the bellcrank 60 with respect to the lever arm 62 about the vertical pivot axis of the shaft 64.

Means are also provided for biasing the bellcrank 60 and the lever arm 62 toward a position wherein the control lever 18 of the transmission is held in a neutral position. In the particular embodiment of the invention illustrated in the drawings, the means for biasing the bellcrank includes a return bar 80 supported for pivotal movement about a pivot pin 82 spaced from the pivot axis of the bellcrank 60. This means for biasing also includes a pair of pins 84 and 85 projecting upwardly from the upper planar surface of the bellcrank 60, the pins 84 and 85 being spaced apart and positioned on opposite sides of the pivot axis of the bellcrank 60. A coil spring 86 has one end fixed to a free end of the return bar 80 and an opposite end fixed to the frame. The coil spring 86 applies a force on the free end of the return bar 80 tending to force an edge 88 of the return bar 80 into engagement with both of the pins 84 and 85.

In the event that the bellcrank 60 is pivoted in a clockwise direction from the position shown in FIG. 3 to the position shown in FIG. 6, the pin 84 will engage the edge of the return bar 80 forcing it to pivot against the force of the spring 86 in a counterclockwise direction about the pivot pin 82. If the bellcrank 60 is pivoted in an opposite direction, the other pin 85 will engage the return bar 80 also forcing it to pivot against the force of the return spring 86. In a preferred form of the invention the coil spring 86 applies a sufficient rearward force on the return bar 80, that when the operator releases the foot pedal 40, the return bar 80 will apply sufficient force on the pin 84 or 85 that the bellcrank 60 and lever 62 will be returned to a neutral position.

In operation of the lawn and garden vehicle 10, the relative position of the bellcrank 60 and lever 62 can be adjusted such that the transmission control lever 18 will be in its precise netural position when the return bar 80 is in engagement with both of the pins 84 and 85 projecting upwardly from the upper surface of the bellcrank 60 and wherein the bellcrank is in its neutral position. Such adjustment is achieved by loosening the bolt 78 securing the bellcrank 60 to the lever arm 62 such that the lever arm 62 is movable with respect to the bellcrank 60. The foot pedal 40 is positioned in its neutral position. The return spring 86 connected to the return bar 80 will also tend to bias the bellcrank 60 to a neutral position. The lever arm 62 can then be manually adjusted to move the lever arm 18 to a position where the transmission 16 will be in neutral.

In a common commercially available hydrostatic transmission, the precise neutral position of the control lever 18 may vary from one transmission 16 to the next. In one preferred method of adjustment of the transmission 16 to the neutral position, the vehicle 10 is supported such that the drive wheels 14 are elevated and freely rotatable, and the lever 62 can then be manually adjusted with respect to bellcrank 60 until the control lever 18 is moved to a position wherein the drive wheels are not driven either forwardly or rearwardly.

Means are also provided for permitting convenient manual adjustment of the position of the lever 62 with respect to the position of the bellcrank 60. While this means could have other alternative constructions, in the illustrated arrangement this means includes aligned opposed generally V-shaped notches 90 and 92 provided in the lever 62 and in the bellcrank 60. These opposed notches 90 and 92 are adapted to house the blade of a screwdriver or other similar tool, with one edge of the screwdriver blade housed in one of the notches 90 or 92 and with an opposite edge of the blade housed in the other of the notches and in such a manner that twisting movement of the screwdriver about its longitudinal axis will cause adjustable movement of the lever 62 with respect to the bellcrank 60. The screwdriver can be twisted so as to cause pivotal movement of the lever 62 with respect to bellcrank 60 in either a clockwise or counterclockwise direction as is required to position the lever 18 in a true neutral position.

Once the lever 62 is properly adjusted with respect to bellcrank 60, the bolt 78 can be tightened to thereby secure the bellcrank 60 and lever 62 together in fixed relation.

In the illustrated arrangement, the brake pedal 22 is located adjacent the control pedal 40 and is mounted such that the operator must remove his foot from the control pedal 40 to engage the brake pedal 22, thereby precluding engagement of the control pedal 40 and the brake pedal 22 at the same time.

While, as previously stated, the spring 86 applies a force on the return bar 80 to cause the bellcrank 60 and lever 62 to return to the neutral position in the illustrated arrangement, means are also provided for positively causing the return bar 80 to force the bellcrank 60 and the lever 62 to a neutral position when the brake is applied and to thereby insure that the transmission is shifted toward neutral when the brake is applied. As shown in FIG. 6, one end of the return bar 80 includes a transverse portion 98 including an elongated slot 100 generally parallel to the longitudinal axis of the vehicle. An elongated rod 102 has one end 104 connected to an upwardly extending end of the bracket 28, and an opposite end of the elongated rod includes a hook portion 106 housed in the elongated slot 100.

During operation of the vehicle 10, the return bar 80 can pivot about the pivot pin 82 and the hook portion 106 at the end of connecting rod 102 can move freely along the length of the slot 100. In the event the brake 22 is depressed, the hook portion 106 will move forwardly and engage a forward end of the slot 100 ensuring pivotal movement of the return bar from the position shown in FIG. 6 to a position wherein the bellcrank 60 and lever 62 are moved to the neutral position.

While in the illustrated arrangement, the bellcrank 60 and the lever 62 are shown as being mounted above the transmission, it will be understood by those skilled in the art that the bellcrank 60 and lever 62 could be mounted below the transmission and with lever 62 connected directly to the transmission speed and direction control shaft 20 to cause movement of the transmission control shaft 20. The shaft 64, lever 68 and lever 18 could be eliminated. In such a construction the bellcrank 80 would be supported for rotation or pivotal movement around the longitudinal axis of the shaft 20. The return bar 80 would also be mounted below the vehicle transmission so as to engage pins 84 and 85 projecting from the bellcrank 60.

Various features of the invention are set forth in the following claims.

We claim:

1. A control assembly for use in controlling the operation of a transmission, the transmission including a drive control member movable from a neutral position in one direction to cause the transmission to be shifted to a forward driving mode, and movable from the neutral position in an opposite direction to cause the transmission to be shifted to a reverse driving mode, the control assembly comprising:

a first lever supported for pivotal movement about a pivot axis, the first lever being connected to the drive control member for selectively causing movement of the drive control member from the neutral position in said one direction in response to pivotal movement of the first lever from a neutral position to a forward driving position and for selectively causing movement of the drive control member from the neutral position in said opposite direction in response to pivotal movement of the first lever from a neutral position to a rearward drivng position, a second lever supported for pivotal movement about said pivot axis, said second lever being selectively movable with respect to said first lever, a control member supported for pivotal movement from a neutral position in a first direction and from said neutral position in an opposite direction, said control member being adapted to be controlled by the operator, a linkage operably connecting said control member to said second lever such that pivotal movement of said control member causes pivotal movement of said second lever about said pivot axis, and means for selectively securing said second lever to said first lever such that said first lever will pivot about said pivot axis with said second lever when said control member causes movement of said second lever.

2. A control assembly as set forth in claim 1 and further including means for biasing said second lever toward a position wherein said drive control member will be in a neutral position.

3. A control assembly as set forth in claim 2 wherein said means for biasing includes a pair of spaced apart stop members secured to said second lever, and a bar supported for pivotal movement about a second pivot axis parallel to said pivot axis of said first lever and spaced from said pivot axis of said first lever, and said bar engaging both of said spaced apart stop members when the second lever is in the neutral position.

4. A control assembly as set forth in claim 3 wherein said means for biasing further includes resilient spring means for biasing said bar against said stop members.

5. A control assembly as set forth in claim 1 and further including means for selectively adjusting the position of said second lever with respect to said first lever when said means for selectively securing said second lever to said first lever is released and said first and second levers are movable with respect to one another.

6. A control assembly as set forth in claim 1 wherein one of said first lever and said second lever includes a bore and wherein the other of said first lever and said second lever includes a slot aligned with said bore, and wherein said means for selectively securing includes a threaded fastening member extending through said bore and said slot.

7. A lawn and garden vehicle comprising:
a frame,
wheels for supporting the frame for movement along the ground,
an engine,
a transmission driven by said engine and for selectively drivingly connecting said engine to the wheels to drive the wheels, the transmission including a drive control member movable from a neutral position in a first direction to a forward driving position and movable from the neutral position in an opposite direction to a reverse driving position,
a manually movable control member supported for pivotal movement about a pivot shaft between a neutral position and a forward driving position and to a rearward driving position, and
means for drivingly connecting the manually movable control member to the drive control member for causing movement of the drive control member from the neutral position toward a forward driving position when the manually movable control member is moved from the neutral position to a forward driving position and for causing movement of the drive control member from the neutral position toward the reverse driving position when the manually movable control member is moved from the neutral position to the rearward driving position,
said means for drivingly connecting including means for adjustably positioning the drive control member in the neutral position when the manually movable control member is in the neutral position, and
said means for adjustably positioning including a first lever connected to said drive control member, said first lever being supported for pivotal movement about a first pivot axis and a second lever supported for movement about said first pivot axis, and means for selectively and adjustably securing said second lever to said first lever.

8. A lawn and garden vehicle as set forth in claim 7 wherein said means for selectively adjustably securing said second lever to said first lever includes means for permitting said second lever to be selectively and adjustably pivoted about said first pivot axis with respect to said first lever.

9. A lawn and garden vehicle as set forth in claim 7 wherein said first lever is connected to said transmission drive control member and said second lever is connected to said manually movable control member.

10. A lawn and garden vehicle as set forth in claim 7 and further including means for resiliently biasing said second lever toward a neutral position wherein said drive control member is in said neutral position.

11. A lawn and garden vehicle as set forth in claim 10 wherein said means for resiliently biasing said second lever toward a neutral position includes a pair of spaced apart stop members projecting from one of said first lever and said second lever, said stop members being positioned on opposite sides of said pivot axis, and a stop bar having one end supported for pivotal movement about a second pivot axis spaced from said first pivot axis and parallel to said first pivot axis, a spring connected to said opposite end of said stop bar and biasing said stop bar into engagement with said stop members.

12. A lawn and garden vehicle as set forth in claim 7 wherein said means for drivingly connecting the foot pedal to the drive control member includes means for connecting said foot pedal to one of said first lever and said second lever for causing pivotal movement of said one lever in a first direction in response to movement of said manually movable control member forwardly and for causing pivotal movement of said one lever in a second direction in response to movement of said manually movable control member rearwardly.

13. A lawn and garden vehicle as set forth in claim 7 wherein one of said first and second levers includes a bore and the other of said first and second levers includes a slot, and wherein said means for adjustably connecting first lever and second levers includes a bolt extending through said slot and through said bore.

14. A control assembly for use in controlling the operation of a transmission, the transmission including a drive control member movable from a neutral position in one direction to cause the transmission to be shifted to a forward driving mode, and movable from the neutral position in an opposite direction to cause the transmission to be shifted to a reverse driving mode, the control assembly comprising:

a first lever supported for pivotal movement about a pivot axis, the first lever being connected to the drive control member for selectively causing movement of the drive control member from the neutral position in said one direction in response to pivotal movement of the first lever from a neutral position to a forward driving position and for selectively causing movement of the drive control member from the neutral position in said opposite direction in response to pivotal movement of the first lever from a neutral position to a rearward driving position, a second lever supported for pivotal movement, said second lever being selectively movable with respect to said first lever, a control member supported for movement from a neutral position in a first direction and from said neutral position in an opposite direction, said control member being adapted to be controlled by the operator, a linkage operably connecting said control member to said second lever such that movement of said control member causes pivotal movement of said second lever, and means for selectively securing said second lever to said first lever such that said first lever will pivot about said pivot axis when said control member causes movement of said second lever.

15. A control assembly as set forth in claim 14 and further including means for biasing said second lever toward a position wherein said drive control member will be in a neutral position.

16. A control assembly as set forth in claim 15 wherein said means for biasing includes a pair of spaced apart stop members secured to said second lever and a bar supported for pivotal movement about a pivot axis parallel to said pivot axis and spaced from said pivot axis, and said bar engaging both of said spaced apart stop members when the second lever is in the neutral position.

17. A control assembly as set forth in claim 16 wherein said means for biasing further includes resilient spring means for biasing said bar against said stop members.

* * * * *